Nov. 1, 1966

J. H. LINDAHL 3,283,229

DUAL REDUNDANT, ADAPTIVE MOTOR CONTROL WITH FAIL SAFE FEATURES

Filed May 24, 1962

INVENTOR.
JOHN H. LINDAHL

BY

ATTORNEY.

INVENTOR.
JOHN H. LINDAHL
BY *Gordon Reed*
ATTORNEY.

United States Patent Office 3,283,229
Patented Nov. 1, 1966

3,283,229
DUAL REDUNDANT, ADAPTIVE MOTOR CONTROL WITH FAIL SAFE FEATURES
John H. Lindahl, Wayzata, Minn., assignor to Honeywell Inc., a corporation of Delaware
Filed May 24, 1962, Ser. No. 197,523
22 Claims. (Cl. 318—18)

This invention relates to servo control systems and in particular to those control systems in which components are duplicated for fail safety reasons. Thus the invention is concerned with redundant servo control systems and in particular to redundant fail safety control systems for moving craft such as aircraft.

Duplication as envisioned herein consists in providing two substantially duplicate channels for jointly controlling a servo means that operates a control member. Each duplicate control channel for purposes of illustration is substantially in the configuration of an adaptive control system such as disclosed in a prior application of Remus N. Bretoi, Serial No. 12,055, filed March 1, 1960 now Patent 3,057,584.

With duplicate channels, each channel as in the aforesaid Bretoi application, embodied in a system as herein the arrangement is referred to as a dual redundant adaptive flight control system and provides maximum utilization of both the adaptive control concepts more fully disclosed in the aforesaid Bretoi application and also of redundant techniques.

A specific dual redundant adaptive controller or system as illustrated herein has been developed to take advantage of various redundant techniques and adaptive flight control concepts for high performance aircraft. It utilizes these redundant techniques through unique application of a fail safe, dual-redundant gain changer.

An object therefore of this invention is to provide a dual redundant adaptive flight control apparatus for moving aircraft such as high performance aircraft or aerospace vehicles.

A further object of this invention is to increase the reliability of an adaptive control system through dual redundant concepts related to the gain changer of existing type adaptive control systems.

A further object of this invention is to provide, along with fail safe operation through redundant techniques applied to an adaptive control system, a servo monitor for disengaging or rendering inoperative the servomotor from controlling the moving craft.

A further object of this invention is to provide a monitor for comparing the inputs to the two gain changers of the adaptive channel.

The above and other objects and features of the invention will be explained more fully in the following description of a preferred embodiment of the invention, which is applied to aircraft control systems for flying control of an aircraft or aerospace vehicle, in conjunction with the accompanying drawings, in which.

A prime requirement of automatic flight control systems for high speed aircraft or hypersonic vehicles is that they be fail safe. In other words this necessitates a flight control system design in which no single failure can cause vehicle destruction.

While fail safety may be provided by disengaging the control system on the detection of a malfunction of a monitor channel, this technique reduces the reliability to one half because of the monitor being a duplicate channel. The dual redundant system herein greatly increases the reliability over a single channel because both are controlling at the same time and the failure in one channel would still leave one in control.

Yet, a further prime requirement of automatic flight control systems for high speed aircraft operable over a wide speed range and wide altitude changes is that the corrective control moments of the control surface of the aircraft applied to correct for similar deviation in craft attitude be maintained substantially constant to provide effective control and to avoid instability. While provisions have theretofore been made in linear flight control systems to modify control surface displacement for a given error signal by air speed compensation or scheduling means or altitude compensation, it is preferred herein to utilize the altitude compensation, it is preferred herein to utilize the adaptive control ssytem as in the aforesaid Bretoi application which compensates for air speed and altitude changes without requiring such scheduling means.

To provide the necessary fail safe aspects and to greatly increase the reliability of such adaptive control system, a dual redundant adaptive control system is provided herein. Thus by the use of redundant adaptive flight control principles in high performance aircraft there is provided a maximum utilization of the adaptive control concept and redundant techniques for fail safety and reliability provisions.

Increasing the reliability and fail safety operation in flight control systems for hypersonic vehicles requires redundant mechanization for at least during specific portions of the flight profiles of such vehicles wherein direct manual control is inadequate to control the craft in the event of control system failure. Therefore the dual redundant adaptive technique provided herein furnishes a significant increase in the system reliability while maintaining fail safe adaptive flight control operation.

ADAPTIVE CONTROL CHARACTERISTICS

Figure 1:
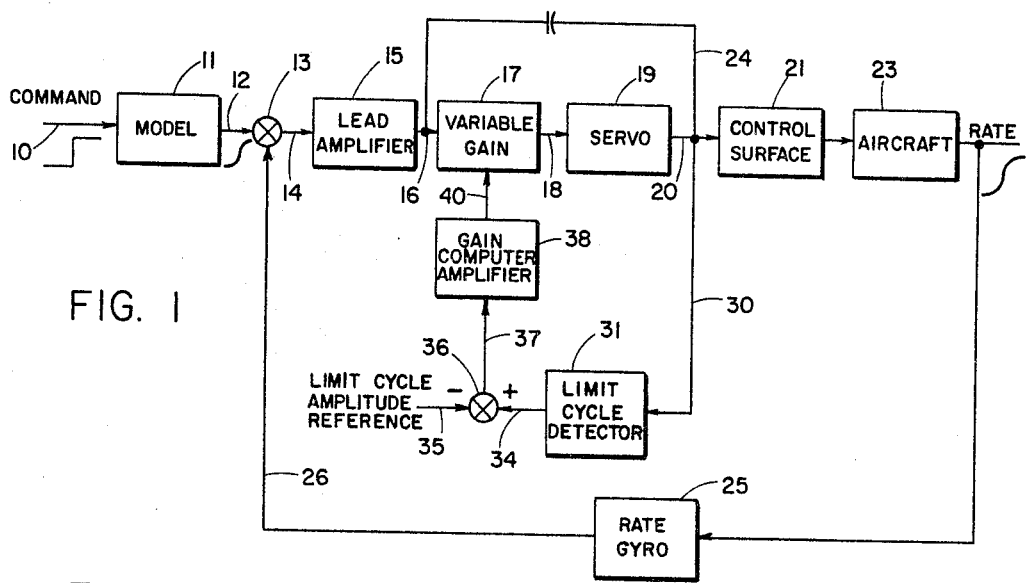
FIGURE 1 is a block diagram of an example of an adaptive control system.

The detailed features of an adaptive flight control system are more fully disclosed in the aforesaid Bretoi patent, and it is desirable that they be basically understood to fully appreciate their application in a dual redundant mechanization. A brief review of the adaptive control system characteristics is supplied here for those more familiar therewith. With reference to FIGURE 1, a command signal on conductor 10 which as indicated may be a step input is supplied to a model 11 which has an output representative of the desired response of the craft for all commands. The output of the model appearing on conductor 12 is supplied, as the command input to the closed loop portion of the adaptive control system, to a summing device 13 and thence through conductor 14 to a lead amplifier 15. An output conductor 16 from amplifier 15 is connected to a variable gain amplifier 17, for varying the loop gain, having its output supplied through conductor 18 to control a reversible servo 19. The servo supplies its output through operating means 20 to a control surface 21 of an aircraft 23. The craft 23 in response to the control moment applied thereto by the displaced surface 21 incurs an angular rate which is sensed by the rate gyroscope 25, as the angular rate sensing means, which has its output supplied through conductor 26 to the summing means 13 so that the rate gyro output is a measure of the actual vehicle response. Vehicle 23 is made to follow the output of the model 11 by maintaining a high gain in the control loop following the model commands appearing on conductor 12.

This control loop which includes rate gyro 25, lead amplifier 15, of the high gain type, variable gain amplifier 17 having a lagged feedback so that the input signal has a phase lead as conventional, servo 19 and aircraft 23 must have a band width at least three times the band width of the model 11 to prevent further shaping of the command due to the controller dynamics. This wide band width is obtained primarily through an automatic gain control for the control loop which continuously seeks the maximum gain operating condition. This gain level is called critical gain, and it is evidenced or detected by means 31 functioning as a small-amplitude limit cycle detector. The amplitude of this limit cycle appearing on conductor 34 (equivalent to roughly .1 degree of surface deflection) is compared at summer 36 to a reference limit cycle amplitude set point appearing on conductor 35 and tightly controlled to this reference amplitude by a gain computer 38. Any tendency for the limit cycle to become larger results in an immediate gain reduction of amplifier 17, while loss of the limit cycle initiates an immediate gain increase thereof. This adaptive technique therefore provides uniform aircraft response to commands throughout the flight envelope which covers a wide range of airspeed and altitude by varying the flight control system gain as an inverse function of the aircraft control surface effectiveness. Thus uniform craft control is obtained through the operation of a self-contained computer. Thus the adaptive concept is independent of air data inputs of speed and altitude provided to a linear control system from the central air data computer. This independency, now being evident, is an important consideration when providing a reliable fail safe redundant mechanization.

REDUNDANT DUAL CHANNELS

Figure 2:
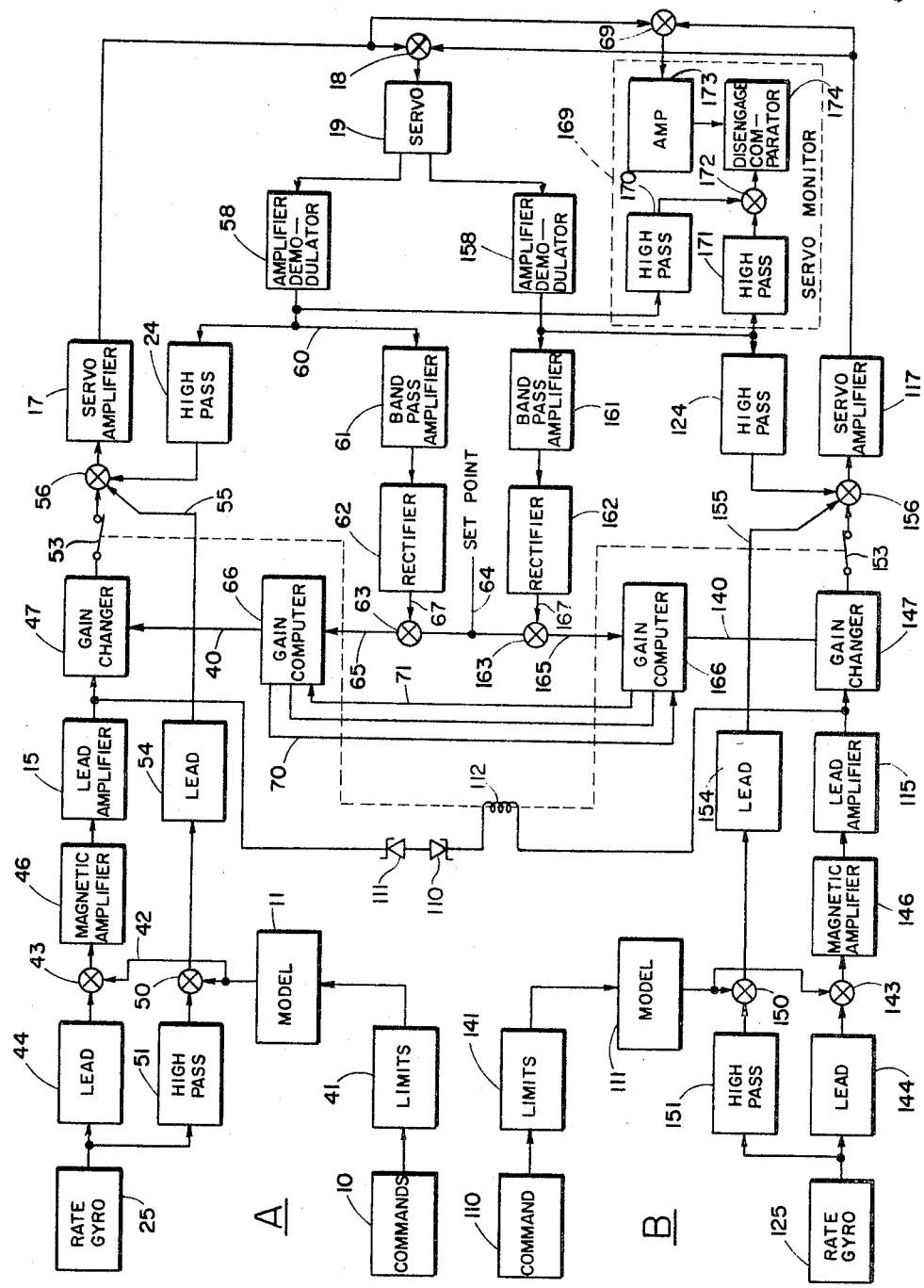
FIGURE 2 is a simplified block diagram of the dual redundant adaptive control system.

FIGURE 2 shows the entire dual redundant adaptive control system wherein as evident the separate channels A and B, each having a variable gain closed control loop, are substantially duplicates. Channel A is basically the same as the single channel represented in FIGURE 1 with the input commands from source 10 being supplied through a signal limiter 41 to model 11 having its output in one instance applied in turn, as the command input to the closed loop portion of the adaptive control system, to a signal summing arrangement 43 to which also is supplied a signal from rate gyro 25 through lead network 44. The summing device 43 has its output supplied to magnetic amplifier 46 which in turn supplies its output to lead amplifier 15. Amplifier 15 through control loop gain changer 47 and switch arm 53, to be deescribed, and summing arrangement 56 controls the servo amplifier 17 that through summing device 18 effects the operation of servo 19. The output of model 11 in another instance is also supplied to a summing device 50 which receives an input from rate gyro 25 through a high pass network 51. The output of summing device 50 is supplied through lead network 54 and conductor 55 to the summing device 56 to provide further control signals to servo amplifier.

The operation of the servomotor 19 provides a followup signal which is of the 400 cycle A.C. type, and amplifier demodulator 58 converts the followup signal into a reversible D.C. signal which indicates the servo motion which is then supplied through high pass network 24 to summing device 56.

The gain for the aforesaid control loop as reflected in the response from the rate gyro 25 through the effect on the craft from operation of servo 19 will now be described.

System gain or gain in the closed control loop for the above arrangement is controlled by also supplying the output from amplifier demodulator 58 over conductor 60 to a band pass amplifier 61 (limit cycle detector) responsive basically to the limit cycle frequency of the rate control loop as evidenced by the servo motion. The filtered signal passes from amplifier 61 to rectifier 62 and the rectified D.C. signal having an amplitude in accordance with the amplitude of the servo motion at the limit cycle frequency and appearing on conductor 67 is combined at summing device 63 with a reference signal voltage or set point limit cycle amplitude signal on conductor 64. The output of the summing device 63 which is the difference between the set point value on 64 and the output of rectifier 62 is supplied by conductor 65 to a gain computer 66, more fully to be described. The output from the gain computer is supplied through conductor 40 to control the gain of gain changer 47.

Similarly channel B comprises a source of command signal 110 having its output supplied through signal limiter 141 to model 111 having in turn its output in one instance supplied to summing means 143 where it is combined with the signal from rate gyro 125 transmitted through lead network 144. The output of summing device 143 is supplied to a magnetic amplifier 146 which in turn through lead amplifier 115 supplies the signal to gain changer 147. Gain changer 147 controls the signal supplied through switch 153 to summing device 156 which controls servo amplifier 117. Servo amplifier 117 controls through summing device 18 the control signal on servo 19. The output of model 111 in another instance is combined with high passed rate at summing device 150 which in turn supplies the resultant signal through lead network 154, conductor 155 to summing device 156.

The gain for the aforesaid control loop from the rate gyro 125 through servo 19 will now be described.

The 400 cycle followup signal from servo 19 is supplied to amplifier demodulator 158 which in turn has its output supplied in one instance through high pass network 124 to summing device 156. A second output from amplifier demodulator 158 is supplied through band pass amplifier 161 (limit cycle detector) passing basically the signals in accordance with the frequency of the control loop as indicated by the servo motion to rectifier 162 which in turn has its output supplied to summing device 163 which also receives the set point limit cycle amplitude or reference signal voltage over conductor 64. The summing device 163 in turn through conductor 165 controls the gain computer 166, more fully to be described. The output from the gain computer 166 is supplied through conductor 140 to control the gain of gain changer 147.

The outputs from servo amplifiers 17 and 117 are also supplied to a summing device 69 which is connected to an amplifier 173 in a servo monitor 169 more fully described in an application of Boskovich, Mellen, Lindahl and Mehelich for Control Apparatus Serial Number 197,524. The servo monitor also receives as inputs the output of amplifier demodulator 58 and the output of amplifier demodulator 158.

No novelty is alleged herein for the separate control channels of A and B, and the invention is primarily concerned with the dual redundancy of the two channels. Further, the invention essentially is more directly involved in the relationship of the two gain computers and their respective gain changers 66, 47 and 166, 147 the relationship being indicated by transmission means such as 70, 71 between the two gain computers.

DUAL REDUNDANT GAIN COMPUTER

Figure 3:
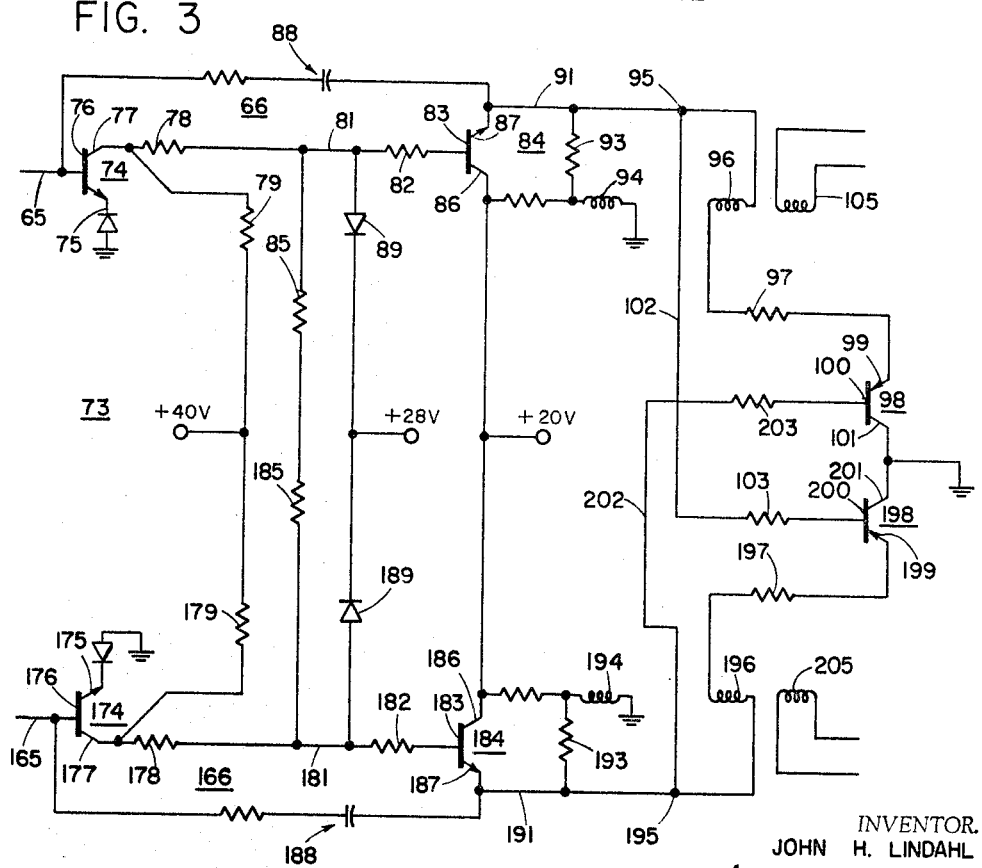
FIGURE 3 is an electrical schematic of the essential novelty of the gain computer interlock circuitry arrangement.

In FIGURE 3 there is shown the essential features of the dual redundant interlocked adaptive gain computers. The essential features are contained in a circuit 73 embodied in the dual redundant adaptive control system. Computer circuit 73 comprises a first section from gain computer 66 and a second section from gain computer 166. Section 66 includes a first transistor amplifier 74 having an NPN type transistor including an emitter 75, base 76, and collector 77. Base 76 is connected to conductor 65 and thus receives a current which is the difference between the set point limit cycle amplitude and the actual amplitude of the limit cycle of the servomotor 19. Collector 77 is connected through series connected resistor 79 to a D.C. voltage source of 40 volts. Collector 77 is also connected through resistor 78, conductor 81, and resistor 82 to a base 83 of a second transistor amplifier 84. Transistor amplifier 84 includes collector 86 and emitter 87 which latter is connected in feedback relation through high pass network 88 to base 76. Emitter 87 is also connected through conductor 91, resistor 93 and winding 94 of a magnetic amplifier (saturable reactor) control winding arrangement to signal ground. Collector 86 is connected to a +20 volt source. Conductor 81 is also directly connected to a 28 volt supply through a diode 89. The output on conductor 91 from amplifier 84 is supplied to a terminal 95 and thence through a second or reverse control winding 96 and resistor 97 to an emitter 99 of a PNP type transistor amplifier 98. The PNP amplifier includes a transistor base 100 and collector 101 which latter is connected to a ground common to a collector 201 of a second PNP type transistor amplifier 198.

Section 166 is a duplicate of section 66 and thus includes an NPN type transistor amplifier 174 having emitter 175, base 176, and collector 177. Control signal currents in accordance with the difference of the set point limit cycle amplitude and the amplitude of the limit cycle are supplied by conductor 165 to base 176. The emitter 175 is connected to signal ground and the collector 177 is connected through resistor 179 to the +40 volt supply. Collector 177 through resistor 178, conductor 181, and resistor 182 is connected to base 183 of transistor amplifier 184.

Series resistors 85, 185 extend between conductor 81 and conductor 181 to equalize the signals on conductors 81, 181 which is represented in FIGURE 2 as a conductor intermediate conductors 70, 71.

Conductor 181 as stated is connected through resistor 182 to base 183 of NPN transistor amplifier 184 having its collector 186 connected to the +20 volt supply and its emitter 187 connected through a feedback arrangement comprising high pass arrangement 188 to the input or base 176 of amplifier 174. The output from emitter 187 is supplied through conductor 191, resistor 193 to a magnetic amplifier (saturable reactor) control winding 194. The output from conductor 191 is also supplied to terminal 195 and from thence to a reverse control winding 196 which is connected through resistor 197 to emitter 199 of the PNP type transistor amplifier 198. A conductor 202 extends from terminal 195 to resistor 203 which in turn is connected to base 100 of PNP transistor amplifier 98.

Considering the operation of an individual section 66 of the computer circuit 73 of FIGURE 3, primarily as to the matter of redundancy, the set point signal is negative whereas the signal from the band pass filter due to the limit cycle from the servomotor 19 FIGURE 2 is positive. Should the set point signal amplitude be greater than the limit cycle signal amplitude, the current through transistor amplifier 74 will decrease, but the current in amplifier 84 will thereby rise in proportion to such decrease. Thus there will be a rising current in winding 94. On the other hand if the limit cycle signal be greater than the set point signal, the current in 74 will increase causing the output of 84 to decrease. The high pass capacitor 88 in the feed-back functions to make transistor amplifier 84 an integrator of the base current supplied to amplifier 74. For a rising output from the integrator from 84, which can vary from zero to +20 volts, this output in control winding 94 varies the saturation of the core of the magnetic amplifier. In turn this saturation level determines the pulse width of a gating circuit to be described to vary the gain of a section and to provide the variable gain function.

Similarly in section 166 if the set point signal is greater than the limit cycle amplitude signal, transistor amplifier 174 has its current reduced and amplifier 184 will have its current increased and increase the current in winding 194.

It will be now evident that when the limit cycle amplitude signal exceeds the set point signal amplitude that transistor amplifier 174 will have an increased current thereby decreasing the output of transistor amplifier 184 reducing the current in winding 194.

The interrelationship of the dual redundant sections 66, 166 will now be considered, since the basic novelty in the dual redundant gain computer circuit is based thereon. In other words the basic advantage of the redundant adaptive gain computer circuit is achieved through the fail safe interlock provisions of the two gain computer sections. The gains in each channel such as section 66, 166 must be essentially the same at all times to obtain the desired limiting effect for hardover failures. This implies that the gain computer integrator output in each section of computers 66, 166 must be equal during normal operation of the gain computers. In clarification of an integrator, due to the high pass feedback arrangements 88, 188, in sections of computers 66, 166 the sections constitute integrators. The dual redundant adaptive flight control system is protected from hardover malfunction by the gain computer integrators themselves. Both of the above features are provided in in the interlocking computer shown in FIGURE 3.

For example the gain of each computer section of channels A and B is maintained at similar instastaneous values by slaving the integrator amplifiers 74, 84 and 174, 184 to each other through the isolating or interlocking circuits comprising the resistors 85, 185. The above is obtained as follows by reference to FIGURE 3, in that normally there is no current through resistors 85, 185. However if the transistor in amplifier 74 fails open circuit, then amplifier 174 will draw current through resistors 85, 185 to control transistor 84 as well as transistor 184.

Additional fail safe circuitry is provided to protect against maximum output failures of output from amplifiers 84 and 184. This involves transistors 98, 198. Assume that the flight condition requires the gain equivalent to five volts out of each gain computer section 66, 166 measured at terminals 95 and 195. Assume however that they are not the same. Assume further that the voltage at terminal 95 is greater positively than the voltage at terminal 195, consequently there is a current through transistor 98 and reverse control winding 96. This current opposes the effect of the current in control winding 94 so that the saturation level of the core is reduced.

Since terminal 195 is less positive than terminal 95 there will be no current through transistor 198 and winding 196, and the current through winding 194 is not opposed. The saturation level is due to the current in winding 194. In other words the circuit elements are so selected that the actual gain in each section 66, 166 or channel as represented by the saturation level is equal to the integrator output (windings 94, 194) minus the difference (effected by windings 96, 196) if the opposite channel output is lower. Thus under normal operation the gain is equivalent to the output of each integrator represented by current flow in windings 94, 194 and there is no current flow in either difference winding 96, 196.

However if we assume a hardover output from the integrator in section 66 which results in a 20 volt output from the integrator and maximum correction winding 94 at the same flight condition, and further assume a five volt output from the integrator in computer 166, the actual gain out of channel A and represented by currents affecting the saturation level of computer section 66 will be 20—15=5 which is the desired gain level.

Channel B will still have the gain of five as its output at terminal 195 is lower than that a terminal 95 of channel A and no difference current can flow through amplifier 198 and in winding 196.

Thus fail safe control of the gain computer circuit 73 is provided by referencing each computer section output to that of the other computer section output. This interlock prevents the output gain in one channel from exceeding the output gain in the other channel regardless of the gain computer integrator output. Restating the actual gain of each channel 66 or 166 is equivalent to the output of its own integrator minus the difference in the two integrator outputs providing, the other integrator output is lower. This means that a difference in the output of the integrators in sections 66, 166, appearing as voltages at 95, 195, will reduce the gain output of the highest gain channel but cannot raise the gain of the low gain channel. This interlock circuitry operates when both gain computers 66, 166 are actually providing an output, and it does not substantially reduce the opposite channel gain if one gain computer is inoperative and not calling for a specific output of its own. To explain, transistor amplifiers 98, 198 must be turned on with a base current through resistors 103, 203. Thus if there is no voltage output at 195, transistor amplifier 98 cannot be turned on. No reverse current can flow in winding 96. This provides continuous adaptive operation if one gain computer circuit opens up or loses its output due to loss say of its power supply.

Figure 4:
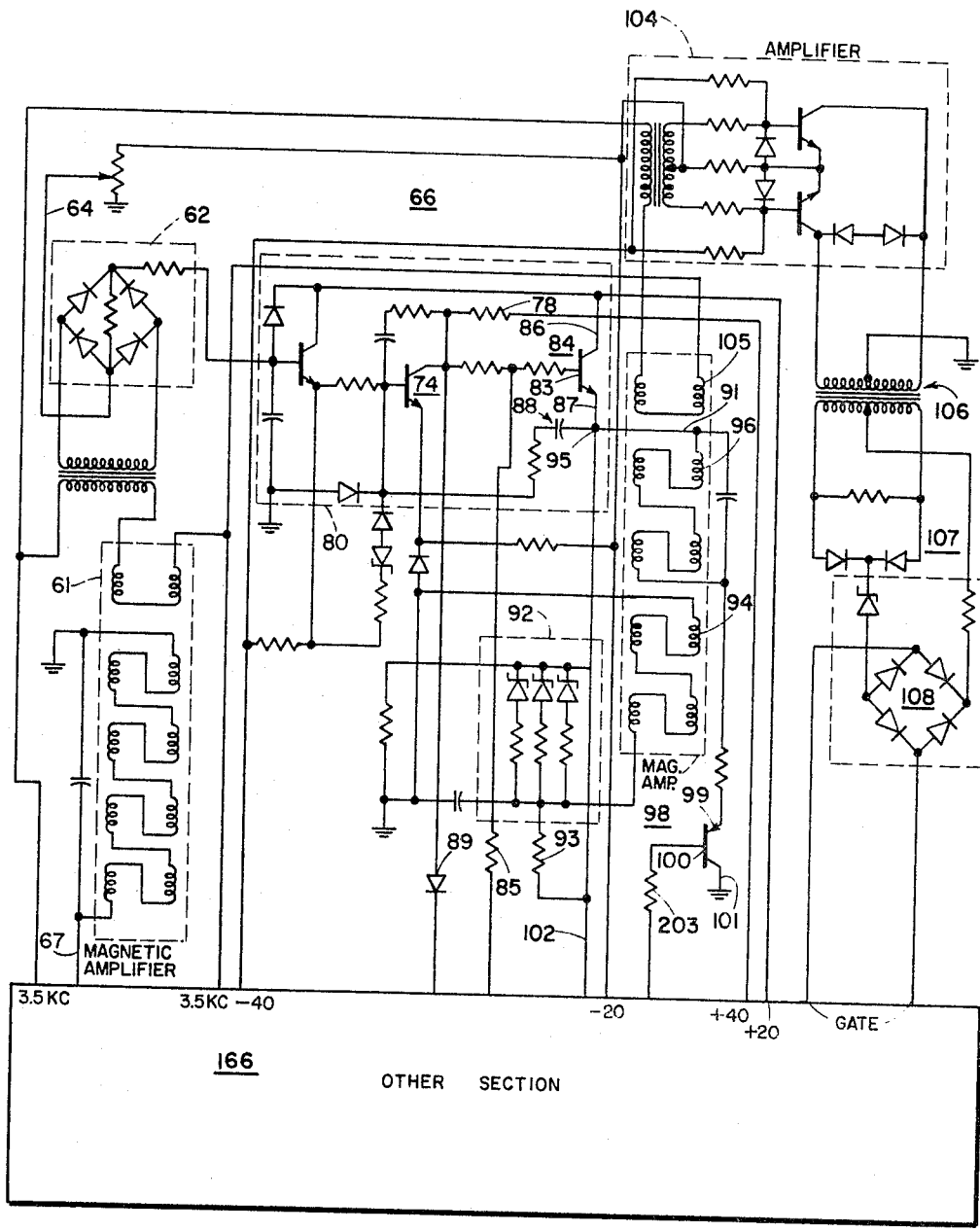
FIGURE 4 is a preferred embodiment of the complete adaptive gain computer of which two channels are provided one being shown in detail to provide the dual redundant interlock arrangement of FIGURE 3.

In FIGURE 4 there is shown in full detail a preferred form of one gain computer section such as section 66 of the dual redundant gain computer circuit 73 of FIGURE 3 and the second computer section 166 is in block form since it is a duplicate of section 66. In connection with an explanation or description of FIGURE 4 the output of one section coacts with an adaptive control system such as illustrated in FIGURE 5 of the aforesaid Bretoi application. A different packaging arrangement of the gain computers 66, 166 from that shown in FIGURES 2 and 3 is shown in FIGURE 4, but it will be evident that the similar function is provided by the components therein.

In FIGURE 4 section 66 of the redundant dual gain computer circuit 73 comprises band pass filter mag amplifier section 61; a full wave rectifier section 62 corresponding with a similar section in FIGURE 2; an integrator amplifier arrangement 80 comprising the transistor amplifiers 74 and 84 of FIGURE 3; a magnetic amplifier section 91 having windings 94, 96 105 corresponding with similar windings in FIGURE 3; amplifier 98 corresponding with the similarly numbered amplifier in FIGURE 3; a nonlinear network 92; an amplifier 104 which energizes a transformer 106, corresponding with transformer 85 of the aforesaid Bretoi patent, a gate 108 of a portion 107 of the gain changer corresponding with the gate 83 in gain changer 82 of the aforesaid Bretoi patent. Thus the dual redundant gain computer circuit 73 herein may be utilized in connection with two adaptive control systems as in the aforesaid Bretoi application to provide a fail safety arrangement.

Since the gain computer 66 depends on inputs from a set point reference and from the band pass filter passing the servo amplitude limit cycle frequencies, in FIGURE 4, the set point signal voltage is obtained over conductor 64 upper left corresponding with a similarly numbered conductor in FIGURE 2. The limit cycle amplitude signal is supplied as an input to the magnetic amplifier lower left by conductor 67 which has its output converted by rectifier 62 to D.C. voltage which is summed with the set point voltage on conductor 64. The set point signal as evident is negative with respect to ground whereas the limit cycle amplitude signal is positive with respect to ground.

Reviewing the further operation of the dual redundant gain computer circuit 73 with respect to FIGURE 4, the gain computer integrator output from amplifiers 74, 84 of section 66 and appearing at terminal 95 is a positive voltage level which varies directly with the desired gain output as determined by the integral of the difference between the set point signal and the limit cycle amplitude signal. This positive voltage source feeds two control windings 94, 96 which are wound in opposite directions. The normal winding 94 is referenced to ground, while the difference winding 96 is referenced back to the other channel integrator output through transistor isolating circuit comprising amplifier 98 which allows current flow in one direction only. The actual output of each gain computer section 66 or 166 is proportional to the algebraic summation of the control winding currents with the actual gain output in proportion to the saturation level of the core 105 of section 66 for example. The current in the two control windings 94, 194 can only flow in one direction, and the difference control coil current in windings 96, 196 will always flow in a direction to reduce the gain of the normal integrator output in winding 94 for example.

An additional fail safe provision is provided by comparator 68 FIGURE 2 which functions to protect against maximum output failure of the lead amplifiers 15, 115 of FIGURE 2. Comparator 68 comprises back to back Zener diodes 110 111, in series with an operating winding 112 all connected across the outputs of lead amplifiers 15, 115. The maximum output of either lead amplifier 15, 115 is +20 volts so that an "open" failure will not overcome Zener diodes 110, 111. However if one lead amplifier fails to a maximum output of +20 volts, the normal input signals to the other lead amplifier will provide a negative output of the other lead amplifier thus causing a current through winding 112. Energized winding 112 operates switches 53, 153, removing the hardover signal from the servo amplifiers 17 and 117. Aircraft control is maintained through the alternate circuit through conductors 55, 155.

It will now be evident that I have provided a novel dual redundant adaptive control system wherein fail safety provisions are depicted for a novel dual redundant gain changer which system provides increased reliability while maintaining fail safe adaptive flight control operation despite failure in the gain changer redundant elements.

What is claimed is:

1. A dual redundant adaptive flight control system having two adaptive control channels, each channel including a variable gain control loop having a gain computer-control loop gain changer arrangement each gain computer being responsive to a limit cycle frequency of an output member of its adaptive control channel which output member is positioned by a servo and controls a flight condition, means in one channel gain computer providing a resultant output to the control loop gain changer computed from the difference between a normal output of the gain computer dependent upon the limit cycle amplitude and a quantity dependent on the normal output of said one gain computer and the normal output of the other gain computer, and means adjusting the control loop gain changer from said resultant output, to increase the reliability of servo operation in said flight control system.

2. A dual redundant control system for operating a servomotor to control a condition comprising two equivalent high gain channels each including a variable gain control loop having signal providing means, a variable, control loop gain changer responsive thereto, and servo control means responsive to the gain changer; a gain computer having its output controlling the gain of said gain changer; and means cross connecting each gain computer whereby each computer has a final output that varies with an intermediate output dependent on the limit cycle operation of the servomotor and a quantity dependent on the intermediate outputs of both gain computers, and thereby increasing the reliability of servo control in said control system.

3. A redundant component control system having servo means for actuation of a control surface of a moving craft comprising: a first servo means control channel including a variable gain device; a second servo means control channel including a variable gain device; camputing means in each channel operated by the servo means for ultimately controlling the gain device in its channel in accordance with the operation of the computing means, one computing means being responsive to the operation of the servo means and a quantity dependent on the difference in response of each computing means to the servo means wherein the computing means is operated by the amplitude of the limit cycle of the servo means of an adaptive system.

4. A redundant adaptive control system having servo means for actuation of a control surface of a moving craft comprising: a first adaptive servo control channel including a source of signal, a model representing a desired craft response controlled by said signal, a variable gain device controlling the servo means; a second adaptive servo control channel including a source of signal, a model representing a desired craft response, and a variable gain device controlling the servo means; and gain computing means for one gain device providing an ultimate control thereto dependent upon the difference of one quantity dependent upon response of the computing means to the servo means and a quality dependent upon the difference in response of each computing means to the servo means.

5. The apparatus of claim 4 and craft rate sensing means applying a control signal to the variable gain device.

6. A control system having servo means for autuation of a control surface of a moving craft comprising: a first adaptive servo control channel including a source of variable control signal, an analog model receiving the signal providing an output signal representing a desired response of the craft to said variable control signal, a variable gain changer responsive to said output signal controlling said servo means; a second adaptive servo control channel including a source of signal, a model representing a desired response of the craft to the signal and a variable gain changer responsive to the model output signal controlling the servo means; and a computing means controlling the gain changer of each channel and thus the gain of each channel and responsive to the amplitude of a limit cycle of operation of the servo means, a limit cycle amplitude reference signal, and a quantity dependent on the difference in response of each computing means to the limit cycle amplitude reference and the limit cycle frequency amplitude of the servo means.

7. An adaptive dual redundant channel control system having servo means for actuation of a control surface of a moving craft comprising: a first adaptive servo control channel including a source of signal, a model representing a desired craft response controlled by the signal, and a variable gain device controlled by the model and operating the servo means; a second servo control channel including a source of signal, a model representing a desired craft response to the signal, and a variable gain device controlled by the model and operating the servo means; a gain computer for each gain device; and a fail safe interlocking arrangement between the two gain computers to assure that the gain of each channel is maintained at similar instantaneous values, to increase the reliability of the servo control of said servo means.

8. The apparatus of claim 7 wherein each computing means is responsive to the amplitude of a limit cycle of the servo means, and the interlock between the two computing means is responsive to the difference between the response of each computing means to the amplitude of the limit cycle of the servo means.

9. A redundant adaptive control system having servo means operative at a limit cycle of predetermined amplitude for optimum control for actuation of a control surface of a moving craft comprising: a first adaptive servo control channel including a source of signal, a model representing a desired response of the craft controlled by the signal, and a variable gain changer; a second adaptive servo control channel including a source of signal, a model representing a desired response of the craft controlled by the signal, and a variable gain changer; computing means controlling the gain changer and operated by the difference in amplitude of the limit cycle frequency of the servo means and a reference amplitude; and an interlock between the two computing means to prevent the outputs from the two computing means to the gain changers from diverging and thus maintain both adaptive servo control channels at the desired gain level, said interlock providing to each computing means a quantity which is the difference between the response of one computing means to the difference between the limit cycle amplitude and the reference amplitude of one computing means and response of the other computing means to the amplitude of the limit cycle frequency of the servo means and the reference amplitude.

10. A control system having servo means for actuation of a control surface of a moving craft comprising: a first servo control channel including a variable gain device operating the servo means; a second servo control channel including a variable gain device operating the servo means each servo control channel including a source of control signal and a followup signal; a computing means in each channel controlling the gain devices and operated by the signal from the servo means dependent upon the limit cycle amplitude of the servo means and a reference amplitude; to provide an intermediate output voltage of the computing means, and an interlock or cross coupling between the computing means to modify its intermediate output in accordance with a quantity which is the difference between its intermediate output and the intermediate output of the other computing means whereby loss of the one of the feedback signals from the servo means will call for a higher output to increase the gain in that channel which is opposed by the decrease in gain effected through the computing means of the other channel.

11. A redundant control system having servo means for actuation of a member controlling a condition of a moving craft comprising: a first servo control channel including a variable gain device operating the servo means; a second servo control channel including a variable gain device operating the servo means, each channel receiving an input signal and a feedback signal from the servo means; means controlling each gain device comprising a computing means providing an output adjusting each gain device to vary channel gain and dependent on the amplitude of a signal from the servo means at its limit cycle frequency and to an intermediate output of the other computing means.

12. The apparatus of claim 11, wherein the computing means is also responsive to the amplitude of a reference signal.

13. The apparatus of claim 11, wherein a signal dependent on a function of craft condition is applied to each control channel.

14. The apparatus of claim 12 wherein a signal dependent on craft rate is supplied to each control channel in opposition to said input signal thereo.

15. Fail safety apparatus for an aircraft control system comprising: a plurality of signal transmission control channels each jointly with the other controlling a servomotor coupled to drive an output member in response to similar control signals supplied to each channel, one channel being supplied with a control signal by operation of a servomotor; and means comprising a gain computer, one for each control channel, responsive to the servomotor operation limit cycle; a gain changer connected to a channel for varying the gain of a channel, in response to a control signal, in accordance with the amplitude of a limit cycle of the servomotor and the difference between the response of the two gain computers to said limit cycle amplitude signal.

16. The apparatus of claim 15, and means supplying to each said gain computer a signal in accordance with a reference standard in opposition to the limit cycle amplitude signal.

17. The apparatus of claim 16, and further means responsive to the output of both control channels and operation of the servomotor and effective on predetermined difference rendering ineffective said servomotor from operation of said control member.

18. The apparatus of claim 11, and monitoring means receiving a control signal from each variable gain device and also a signal from said servo means and effective on predetermined difference thereof rendering the servo means ineffective to control said craft.

19. In a dual redundant adaptive control system having two channels operating servo means each receiving a similar control signal and including a lead amplifier in each channel, monitoring means connected across the outputs of the lead amplifiers and effective when such outputs are of opposite signs, disconnecting such amplifiers from the servo means.

20. The apparatus of claim 19 wherein the algebraic difference of the outputs must exceed the maximum output of either amplifier.

21. The apparatus of claim 20, and additional means bypassing said monitoring means and controlling the servo means.

22. An adaptive dual redundant channel control system having servo means for actuation of a control service of a moving craft comprising: a first adaptive servo control channel including a source of signal a model representing a desired craft response controlled by the signal, and a variable gain device controlled by the model and operating the servo means; a second servo control channel including a source of signal, a model representing a desired craft response to the signal, and a variable gain device controlled by the model and operating the servo means; a gain computer for each gain device, each computer including an amplifier; and a fail safe arrangement safe guarding against an open in one computer amplifier comprising an interlocking circuit comprising a further impedance between the gain computer amplifier output members, whereby an output member of each amplifier is both directly connected through a load impedance to a power source and is also connected to a power source through the interlocking circuit and the load impedance of the other amplifier.

References Cited by the Examiner

UNITED STATES PATENTS

| | | | |
|---|---|---|---|
| Re. 25,491 | 12/1963 | Lee et al. | |
| 2,953,733 | 9/1960 | Bretoi | 318 |
| 3,046,487 | 7/1962 | Matzen | 330—19 |
| 3,054,039 | 9/1962 | Meredith | 318 |
| 3,057,584 | 10/1962 | Bretoi | 318 |
| 3,071,336 | 1/1963 | Fearnside | 318 |

ORIS L. RADER, *Primary Examiner.*

JOHN F. COUCH, *Examiner.*

T. LYNCH, *Assistant Examiner.*

UNITED STATES PATENT OFFICE
CERTIFICATE OF CORRECTION

Patent No. 3,283,229                                    November 1, 1966

John H. Lindahl

It is hereby certified that error appears in the above numbered patent requiring correction and that the said Letters Patent should read as corrected below.

Column 2, line 18, for "theretofore" read -- heretofore --; lines 21 and 22, strike out "it is preferred herein to utilize the altitude compensation,"; column 3, line 52, for "deescribed" read -- described --; column 6, line 71, for "a" read -- at --; column 9, line 1, for "camputing" read -- computing --; line 23, for "quality" read -- quantity --; line 29, for "autuation" read -- actuation --.

Signed and sealed this 24th day of October 1967.

(SEAL)
Attest:

Edward M. Fletcher, Jr.                                         EDWARD J. BRENNER
Attesting Officer                                                   Commissioner of Patents